Feb. 13, 1962          H. E. BRAUN          3,020,888
LINEAR MOTION-PRODUCING DEVICE WITH LOCK
Filed July 2, 1959          4 Sheets—Sheet 1

Inventor:
Howard E. Braun,
by (signature)
Attorney.

INVENTOR.
Howard E. Braun,

United States Patent Office 3,020,888
Patented Feb. 13, 1962

3,020,888
LINEAR MOTION-PRODUCING DEVICE WITH LOCK
Howard E. Braun, San Jose, Calif., assignor to General Electric Company, a corporation of New York
Filed July 2, 1959, Ser. No. 824,670
19 Claims. (Cl. 121—40)

This invention relates to fluid-actuated linear motion-producing devices, and it more particularly relates to such devices provided with locking means which function to prevent the generation of linear motion in the absence of the application of a fluid pressure unlocking signal to the device.

Such linear motion-producing devices as herein described are useful in a wide variety of applications where controlled linear movement of an object is needed. For example, such devices may be used in machine tools, jacks, hoists, and in linear actuators in general. Such devices may be used in the remote positioning of objects within an enclosure maintained under non-atmospheric conditions of temperature and pressure. For example, one such application is in the positioning of a nuclear reactor poison or control element in the chain-reacting assembly or core of a nuclear reactor to vary the neutron flux and power levels. For purposes of illustration, the present invention is described in this latter context, although it should be understood that this is not a limitation on the utility of the invention. The invention can be readily applied by those skilled in the art in the field of linear positioning devices generally.

The release of large amounts of energy through nuclear fission reactions is now quite well known. In general, a fissionable atom, such as $U^{233}$, $U^{235}$, $Pu^{239}$, or $Pu^{241}$ absorbs a neutron in its nucleus and undergoes a nuclear disintegration. This produces on the average, two fission products of lower atomic weight and great kinetic energy, and usually two or three neutrons also of high energy. For example, the fission of $U^{235}$ produces a light fission product and a heavy fission product with mass numbers ranging between 80 and 110 and between 125 and 155 respectively, and an average of 2.5 neutrons. The energy release approaches about 200 mev. (million electron volts) per fission.

Fission neutrons thus produced diffuse through the nuclear chain-reacting assembly and are either used or lost in several distinct competing mechanisms. Some neutrons migrate to the boundary of the chain-reacting assembly and escape or are lost from the system. Other neutrons undergo non-fission or radiative capture in the nuclear fuel. Still other neutrons undergo fission capture in the fuel producing additional fission neutrons. For example, fast neutrons are thus captured in $U^{235}$ or $U^{238}$ and thermal neutrons are thus captured in $U^{235}$. Still other neutrons undergo parasitic capture in the various extraneous or non-fissionable portions of the chain-reacting assembly, such as in the moderator, coolant, various structural materials necessarily present, fission products in the fuel, as well as in the nuclear reaction control elements.

The neutron balance between the production of fission neutrons and these various competing mechanisms for neutron utilization determine whether or not over any given time interval the fission reaction is self-sustaining, decreasing, or increasing. When the reaction is self-sustaining, the neutron multiplication factor ($k_{eff}$) equals 1.00, the neutron population remains constant, and on the average, there is one neutron remaining from each fission event which induces a subsequent fission. Heat generation is thus continuous and it may be maintained so long as sufficient fissionable material is present in the system to override the effects of fission products, some of which are very strong nuclear reaction poisons, which will be produced during operation. The heat generated in the system may be removed by passing a coolant through heat exchange relationship with the nuclear fuel in the chain-reacting assembly and such heat may be used as such or to produce mechanical or electrical power.

The neutron balance, and therefore the neutron population and the power level in the chain-reacting assembly, are variable by variation in the extent to which neutrons are consumed or wasted in non-fission capture in the control elements. This consumption of neutrons is in turn variable with the relative amount of control element material in the chain-reacting assembly at a given time. Control elements are conventionally in the form of rods or sheets or blades which are movably positioned in the chain-reacting assembly. A suitable linear motion-producing device is customarily provided to position the control element and thus control the operation of the reactor. Such control elements contain materials whose atoms have very high non-fission neutron capture cross-sections, some of the common materials being boron, cadmium, gadolinium, europium, erbium, samarium, hafnium, dysprosium, silver, and mercury in elemental, alloy, or compound form.

In the nuclear reactor application, and in any other application involving positioning of an element through the wall of a vessel maintained at non-atmospheric conditions of temperature and pressure, a connecting means usually must pass through a fluid-tight seal and yet be free to move through the vessel wall. Such seals are invariably subject to wear, and such wear or partial failure produces fluid leakage. In conventional mechanisms, an actuating fluid is frequently used which is incompatible with the fluids present in the vessel and which presents added seal problems. Further, the conventional fluid-actuated control element positioning mechanisms become inoperative upon failure of the external supply of actuating fluid. In these conventional mechanisms, a control signal frequently must be maintained on the device at all times to maintain a fixed position of the control element. Any variation or failure of this control signal results in an undesirable change in position of the element.

It is therefore an object of this invention to provide an improved linear motion-producing device or drive mechanism which overcomes all of the aforementioned disadvantages and problems.

Another object of this invention is to provide an improved two-line fluid-operated device for remote positioning of an object within a vessel maintained at non-atmospheric conditions of temperature or pressure and which requires no fluid-tight moving shaft seal at the point of vessel penetration.

Another object of this invention is to provide an improved linear motion-producing device having a locking mechanism which prevents linear motion from occurring without the application of a pressure unlocking signal.

Another object of this invention is to provide an improved nuclear reactor control element drive mechanism which is fluid-actuated by fluids indigenous to or compatible with reactor fluids, which remains in the locked position in the absence of an applied pressure unlocking signal, and which automatically drives the control element into the nuclear chain-reacting assembly to terminate the reaction in the event fluid pressures in the reactor are at a value higher by a predetermined amount than the pressure in an independent source of fluids.

Other objects and advantages of this invention will become apparent to those skilled in the art as the illustration and description of several embodiments thereof proceed.

Briefly the improved linear motion-producing apparatus of this invention comprises a stationary element, a reciprocable element disposed coaxially with respect to said stationary element and including a driving piston and a connecting element secured to the piston, means for supplying actuating fluid to move said piston and connecting element, one of said elements being provided with at least one peripheral groove providing a lock surface in a surface of said element immediately adjacent the surface of the other of said elements, the other of said elements being provided with at least one bearing surface, and locking means laterally movable immediately adjacent said bearing surface and normally biased into contact with the grooved surface of said element and adapted to engage said groove and lock said stationary and reciprocable elements together. One embodiment of the invention is an apparatus including stationary coaxial inner and outer tubular elements having an annular space therebetween, a reciprocable tubular element disposed in the annular space and including a driving piston and connecting tube secured to the piston and extending from the annular space for connection to a load, one of the tubular elements being provided with a plurality of locking surfaces in peripheral locking grooves spaced apart from one another on a surface of the element immediately adjacent the other tubular element, and a plurality of laterally movable locking means disposed immediately adjacent at least one lateral bearing surface in the other tubular element and normally biased to lock the tubular elements together as stated above in the absence of a fluid pressure unlocking signal. The invention in one embodiment also includes pressure responsive three-way valve means communicating with the annular space and two independent sources of actuating fluid and adapted to connect said space automatically to the higher pressure source and actuate the driving piston and move the reciprocable tubular element in the event the pressure of fluids in one source is sensed to be more than a predetermined amount greater than the pressure of fluids in the second source. One application of this invention is in the remote positioning of a load within a vessel maintained at non-atmospheric conditions. In such application the linear motion-producing apparatus is positioned in a tubular thimble sealed to the wall of the vessel, the thimble is open to vessel fluids at one end and is sealed at the other end and is effectively an extension of the vessel wall. The various embodiments of this invention are operable under the non-atmospheric conditions referred to above, and are provided with an inner region which can be maintained at atmospheric conditions and in which is disposed inductance means for remotely indicating the position of the reciprocable tubular element relative to the stationary elements.

The structure and the operation of several embodiments of the present invention will be more readily understood by reference to the accompanying drawings in which.

Figure 1:
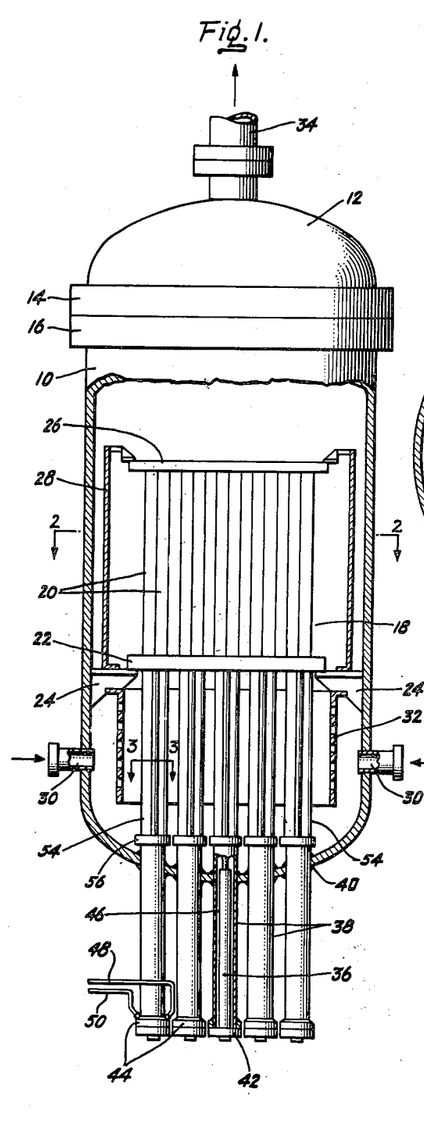
FIGURE 1 is an elevation view in partial cross-section showing the device of this invention applied to the movement of nuclear reaction poison control elements in a nuclear chain-reacting assembly or core.

Referring particularly to FIGURE 1, a reactor pressure vessel 10 is provided with removable head 12 and head flanges 14 and 16. A nuclear chain-reacting assembly or core 18, made up of a plurality of vertically disposed nuclear fuel-containing coolant flow channels 20, is supported within vessel 10 by means of lower core support plate 22 which in turn is secured in vessel 10 by support means 24. Upper core grid guide 26 is provided to secure the upper ends of channels 20 and maintain the relative spacing therebetween. A thermal shield 28 surrounds the reactor core 18 and is spaced inwardly from the inner surface of pressure vessel 10. The thermal shield is supported from support means 24 and functions to attenuate intense gamma radiation emitted by the core to minimize thermal heating of the pressure vessel wall.

The upper and lower ends of channels 20 are open to coolant flow. The coolant is introduced to vessel 10 through inlet openings 30. The coolant flows through a perforated cylindrical coolant diffuser 32 and then upwardly through flow channels 20. The heated coolant, which is partially vaporized in the case of a boiling reactor for example, is removed from vessel 10 through coolant outlet 34.

The control element drive mechanism of this invention is illustrated schematically at 36. It is an integral unit contained in a thimble or pressure vessel extension 38 sealed as by means of welds 40 to the wall of pressure vessel 10. The control elements in this reactor core enter from the bottom; they are withdrawn downwardly out of the core to start up and to raise the power level of the reactor and are inserted upwardly into the reactor core to decrease the power level or shut the reactor down. The control elements can, if desired, be inserted from the top of the core. The distribution of control elements in reactor core 18 and the cross-section of a typical control element are described more particularly below.

The present invention is a two-connection entirely fluid-actuated system with the ability to regulate the control element to any set position and to hold that fixed position permanently until it again receives a command signal to move. Scram, or a rapid reactor shutdown by rapid control element insertion, utilizes only high-pressure fluid either from a separate fluid accumulator or from reactor vessel 10. In any set position, the control element is held fixed by means of a mechanical locking mechanism and is in no way dependent up fluid sources.

The control element drive mechanism 36 consists of an elongated tube or jacket containing the operating mechanism, shown in greater detail in the subsequent figures, and terminated at its lower end in flange 42. This drive mechanism 36 is inserted into thimble 38 and is sealed by means of a metal O ring seal to thimble flange 44. The annular space or jacket annulus 46 between thimble 38 and drive mechanism 36 communicates at its upper end with the fluids present in reactor vessel 10. External control fluid reservoirs are connected by means of two fluid lines 48 and 50 to the thimble flange 44. These are internally ported as hereafter described for connection to the drive mechanism 36.

Figure 2:
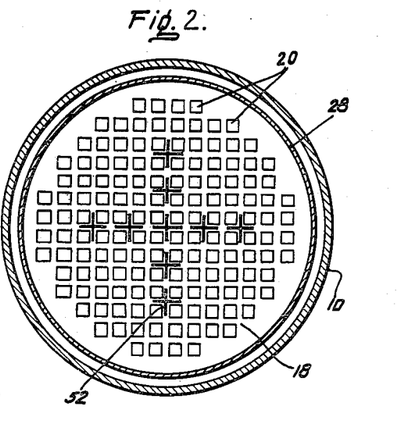
FIGURE 2 is a transverse cross-section view taken through the core as shown in FIGURE 1.

In FIGURE 2 is a transverse cross section of the apparatus of FIGURE 1. Reactor core 18, made up of a plurality of fuel-containing flow channels 20, is surrounded by thermal shield 28, the whole being contained in reactor vessel 10. The flow channels are here shown as being square in cross-section, although other flow channels having circular, hexagonal, or other cross-sections may be employed. In this modification channels 20 are spaced slightly apart from one another in a lattice having a square pitch. Cruciform control elements 52, which may conveniently be 2 percent boron stainless steel, are spaced thoughout the lattice. These control elements are movable into and out of reactor core 18 by means of the device of the present invention.

Figure 3:
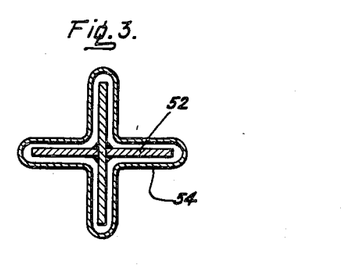
FIGURE 3 is an enlarged transverse cross-section view showing the cruciform cross-section of the control elements indicated in FIGURE 2.

In FIGURE 3 is shown a cross-section view taken as indicated in FIGURE 1 of one of the cruciform control elements 52 which is contained in a guide tube 54, also a cruciform cross-section. The control element guide tubes 54 are shown also in FIGURE 1 extending from core support plate 22 downwardly to upper flange 56 of each of thimbles 38. The control elements 52 are withdrawn downwardly from reactor core 18 into these guide tubes 54.

Figures 4, 5, 6:
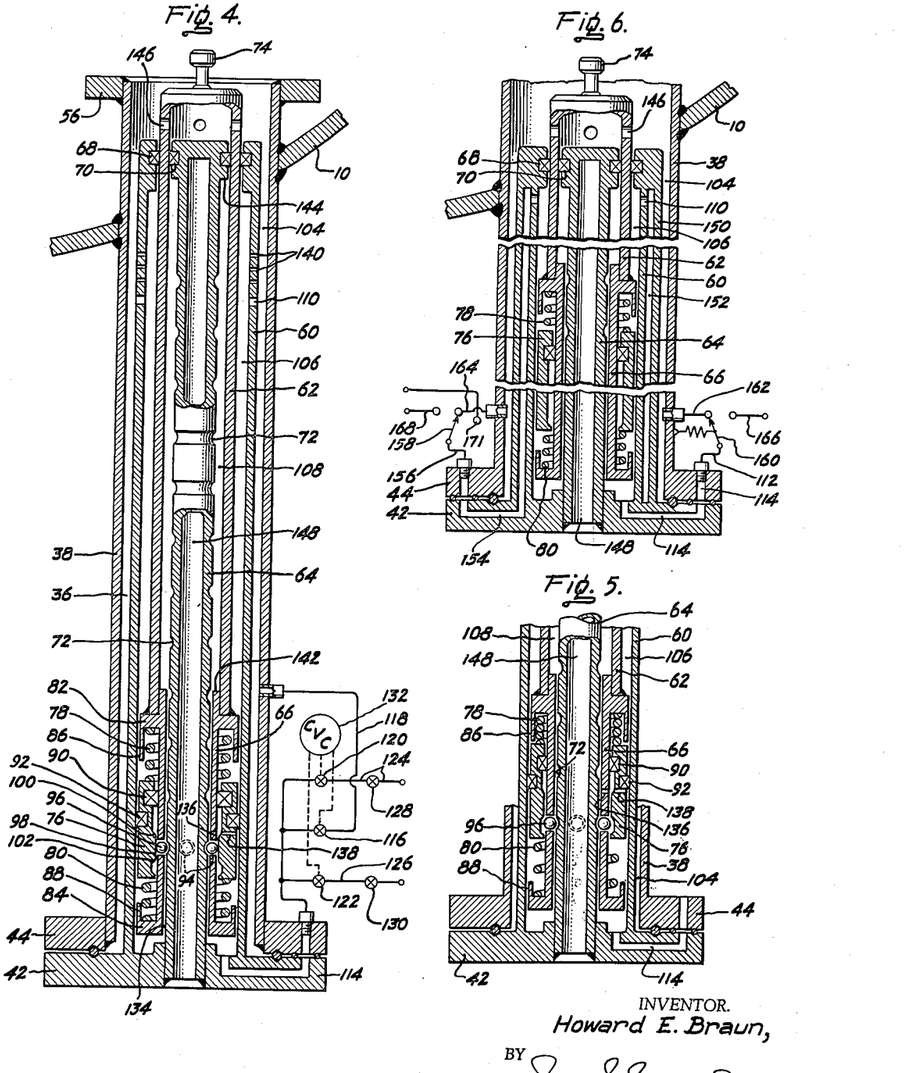
FIGURE 4 is a longitudinal cross-section view of one embodiment of this invention which is provided with a translating or moving locking means.
FIGURE 5 is a longitudinal cross-section view of the translating locking means shown in FIGURE 4 which is here shown in the unlocked position for movement upwardly as the drawing is normally viewed.
FIGURE 6 is a vertically foreshortened view of another embodiment of this invention applied to move a load in a vessel and which incorporates pressure responsive three-way valve means for selecting either actuating fluid from the vessel or actuating fluid from a separate source or accumulator to unlock and move the device in either direction.

In FIGURE 4 a longitudinal cross-section view of one embodiment of this invention is shown. As indicated in FIGURE 1, thimble 38 extends downwardly from the wall of vessel 10 to lower flange 44. The drive mechanism 36 of this invention is contained within thimble 38 and is connected and sealed thereto at flange 44 by means of flange 42.

This embodiment of this invention includes stationary jacket and outer tube 60, a reciprocable tube 62, stationary inner tube or pintle 64, and driving-locking section 66 secured to the end of reciprocable tube 62. Stationary outer and inner tubes 60 and 64 are secured at their lower ends to flange 42 and are provided at their upper ends with outer and inner seals 68 and 70 respectively. Inner tube 64 is provided on its outer surface with a plurality of locking grooves 72 spaced apart from one another along its length.

Reciprocable tube 62 is a long hollow tube having a length equal to the full stroke distance desired to be produced by the mechanism and is disposed in the annular region between tubes 60 and 64. Reciprocable tube 62 is provided at its upper end with a spud 74 by means of which it is connected to the lower end of the control element previously described, or any other load. Tube 62 extends from the upper end of drive mechanism 36 between seals 68 and 70 bearing against both its inside and outside surfaces.

Driving-locking piston section 66 is provided with driving-locking piston 76 and a pair of loading springs 78 and 80 disposed between spring retainers 82 and 84. Extension 86 and 88 of the retainers form fixed limits or stops to limit driving-locking piston travel. Piston 76 is provided with inner and outer piston rings 90 and 92 to seal the annuli between it and adjacent surfaces of outer tube 60 and section 66. Piston 76 is normally maintained at the central position in section 66 as shown in FIGURE 4 by the opposed forces of the loading springs in the absence of a fluid pressure signal, and is reciprocable relative to section 66 between the limits set by extensions 86 and 88 upon application of such fluid pressure signals.

In the approximate center of piston section 66 is located one or more lateral apertures 94 in each of which a locking sphere 96 is disposed. These spheres are of larger diameter than the wall thickness of piston section 66 and they therefore extend beyond either the inner or outer surface of piston section 66. While piston 76 is centered between loading springs 78 and 80, locking land 98, provided with cam surfaces 100 and 102, is disposed immediately outside apertures 94 and behind locking spheres 96. Locking spheres 96 thus project a substantial distance inward radially through aperture 94 beyond the inner surface of piston section 66 and into one of the circumferential grooves 72 thus locking reciprocable tube 62 to inner stationary tube 64. Since inner tube 64 is stationary and the locking spheres 96 are prevented from backing out of grooves 72 due to the presence of locking piston 76 and land 98, any linear load on reciprocable tube 62 merely puts the locking spheres 96 in shear, thus transferring any such load through the spheres to inner tube 64 in which this load is resisted by tension or compression forces. These forces are in turn transmitted through flanges 42 and 44 and thimble 38 to vessel 10.

Piston 76 thus serves to lock the reciprocable tube 62 to inner stationary tube 64 in the absence of a fluid pressure signal, and upon the application of such a signal it unlocks these elements from one another and applies a motive force to move reciprocable tube 62 in the direction of the pressure drop.

To generate a linear movement in connecting tube 62, the locking land 98 of piston 76 must first be moved from its position shown adjacent locking spheres 96. Movement of piston 76 is accomplished by supplying a fluid pressure signal across piston 76 sufficient to overcome friction and the forces of the loading springs 78 or 80 thus causing piston 76 to move in the direction of lower pressure. A significant pressure differential will move piston 76 against the spring load until it is forced against either extension 86 or 88 of upper and lower loading spring retainers 82 or 84. In either of these extreme positions, locking land 98 is displaced from adjacent locking spheres 96. The fluid pressure signal acting on displaced piston 76 is transmitted through either extension 86 or 88 to piston section 66 and connecting tube 62 tending to move it. The shear forces formerly acting through locking spheres 96 are no longer resisted by locking land 98, piston section 66 and tube 62 move, and the spheres are thus forced out of circumferential grooves 72 so that they project radially outwardly beyond the outer surface of piston section 66 into the recessed portions on either side of locking land 98. Piston section 66 and connecting tube 62 are thus no longer locked to inner cylinder 64 and connecting tube 62 can now move with conventional piston action. Piston 76 lifts connecting tube 62 and any load connected to it upwardly or moves it downwardly as long as there is a driving fluid pressure signal or differential across it.

The linear motion is stopped by removing the pressure differential. This may be done by short circuiting the regions above and below piston 76 through suitable fluid lines and a control valve in the external circuit. The pressure differential is thus dissipated. The forces then acting on piston 76 are the centering forces of loading springs 78 or 80, and they act through the upper and lower cam surfaces on locking land 98 to move locking spheres 96 back into openings 94. Connecting tube 62 will move under the influence of gravity or other forces. At the first opportunity; namely upon the alignment of locking spheres 96 with the nearest locking groove 72, the locking sphere is forced out of the piston 76 recess and laterally through aperture 94 into locking groove 72. At its center position, the locking land 98 blocks locking sphere 96 in the position shown in FIGURE 4 to lock the connecting tube 62 again to stationary inner cylinder 64.

In FIGURE 4 several concentric annuli exist between the various concentric elements of this device. Each annulus is identified in the subsequent description in terms of the elements immediately within which it is located. In FIGURE 4, therefore, there are provided thimble annulus 104, outer tube annulus 106, and reciprocable tube annulus 108, the latter two making up the annular space between the stationary inner and outer tubular elements 60 and 64.

Thimble annulus 104 is open at its upper end to communicate with the fluids of vessel 10. Outer tube annulus 106 communicates with thimble annulus 104 through one or more main openings 110 located apart from the upper end of outer tube 60. Actuating fluid inlet 112 communicates through channel 114 in flanges 42 and 44 and opens into the lowermost end of outer tube annulus 106 at a point below piston 76. The position or rate of travel of the drive mechanism is determined by the external hydraulic and electrical control circuits attached to the device. In the normal stationary position of the device, the fluid pressure in the various annuli is slightly above the pressure of fluids present inside vessel 10. Control valve 116, normally open, provides a short circuit between the upper and lower ends of piston 76. This short circuit extends from the upper end of piston 76 through outer tube annulus 106, main openings 110, thimble annulus 104, line 118, control valve 116, line 112, and channel 114 to the bottom of piston 76.

To drive the device in either direction, control valve 116 is closed terminating this short circuit and either of normally closed control valves 120 or 122 is opened. Lines 124 and 126 are connected to fluid accumulators, not shown but conventional, maintained under pressures different by the desired driving pressure gradient from the vessel pressure. The pressure differential across piston 76 in the required direction is applied by opening valve 122 or 124. The rate of travel of connecting tube 60 is determined by the setting of flow control valves 128 and 130 respectively which meters the driving fluid flow into and out of the device, respectively. Control valves 116, 120, and 122 are actuated by control valve controller 132.

The device shown in FIGURE 4 is designed to permit a very rapid insertion of the control element which, in a nuclear reactor system, serves to effect a rapid shutdown or "scram" in the case of a possible emergency. This scram action is merely a faster rate of upward travel than normal and is provided for by increasing the pressure differential across piston 66 to a value sufficiently high to achieve the desired velocity. This also requires the provision of sufficiently large fluid flow lines and valves for the required flow. Scram movement is obtained by applying a high pressure through line 112 and channel 114 to the annular space below piston 76. The resultant upwardly acting pressure differential unlocks the locking device and drives reciprocable tube 62 upwardly at a scram rate, but in the same manner as in normal in-travel. Displaced fluids from outer tube annulus 106 flow outwardly through openings 110. Displaced fluids from reciprocable tube annulus 108 flow through the clearance 134 between piston section 66 and inner tube 64 into the lower region of outer tube annulus 106 which communicates with channel 114. If desired, orifices 136 and 138 through piston section 66 and piston 76 respectively may be provided to facilitate this displaced fluid flow.

Deceleration of the reciprocable tube 62 at the end of the scram stroke can be any orificing scheme usual in linear motion hydraulic mechanisms. Braking herein is provided by a plurality of braking orifices 140 vertically spaced in the wall of stationary outer tube 60 between the main opening 110 and the end of outer tube 60. Near the upper end of scram stroke, outer piston ring 92 passes opening 110 preventing displaced fluid flow therethrough and leaving only the relatively small area of the orifices 140 open to displaced fluid flow from outer cylinder annulus 106. Continued upward movement successively reduces this area as the braking orifices are successively sealed off. The work expended in forcing the displaced fluid at high velocity and at high pressure drop through the successively decreasing area of orifices 140 dissipates the kinetic energy of the moving elements and rapidly reduces their upward velocity. This braking action becomes effective within the last few inches of upward stroke. A positive stop is provided when upper surface 142 of piston section 66 contacts surface 144 provided by the enlarged upper end of stationary inner tube 64.

Openings 146 are provided for displacement fluid flow into and out of the reciprocable tube 62.

Figures 7, 8, 12, 13, 14:
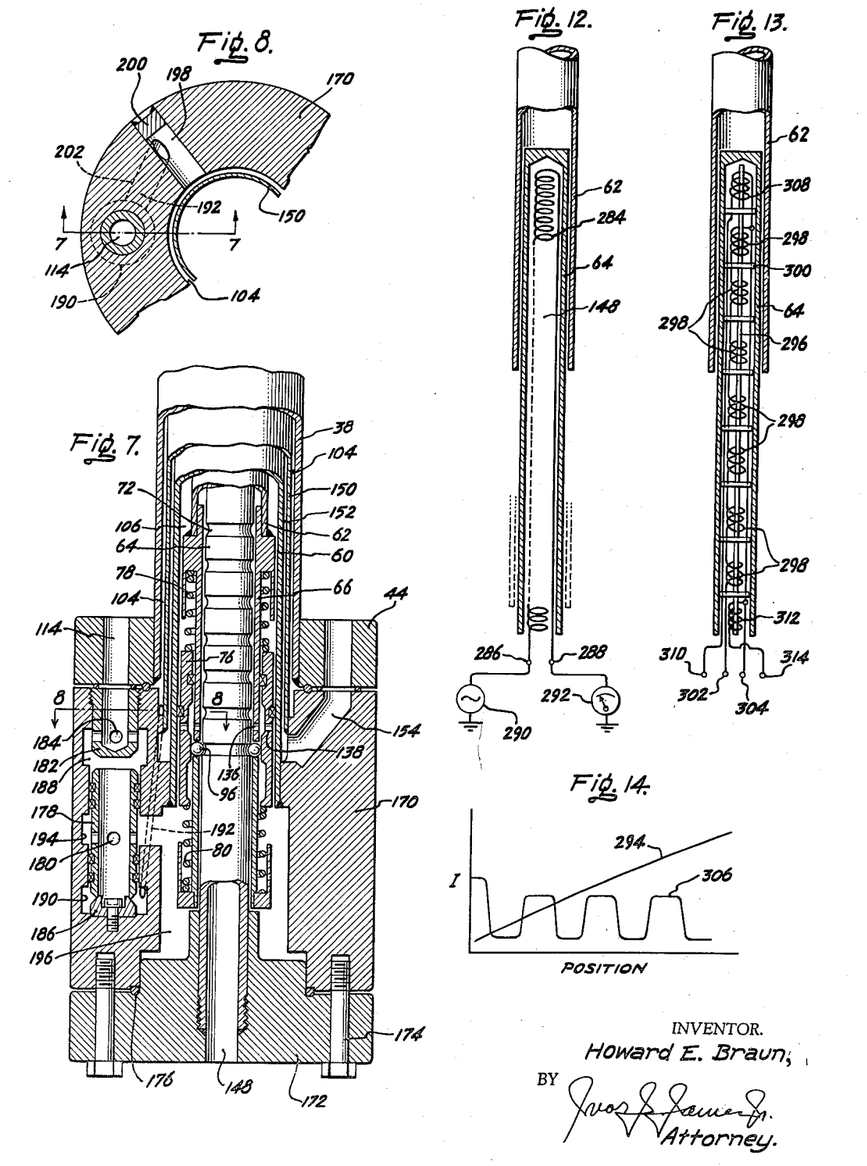
FIGURE 7 shows a partial longitudinal cross-section view of the outer or flanged end of another embodiment of this invention also provided with a translating locking means and with the pressure responsive three-way valve means and internal porting located in the flange to effect the selection of either of two sources of fluids to actuate the device.
FIGURE 8 is a partial transverse cross-section view showing a part of the internal porting.
FIGURES 12 and 13 are semi-schematic illustrations of two forms of the inductance means of this invention to indicate the position of the reciprocable element in the apparatus illustrated in FIGURES 4 through 11.
FIGURE 14 is a graphic illustration of the signals generated by the position indicating devices shown in FIGURES 12 and 13.

Opening 148 is provided in inner tube 64 for inductance means described in FIGURES 12–14.

In FIGURE 5 the lower portion of the device of FIGURE 4 is shown. Identical elements are indicated by the same reference numbers. The device is here shown in its unlocked position for driving upward. In this condition fluid pressure substantially equal to that existing within vessel 10 acts through thimble annulus 104, opening 110 shown in FIGURE 4 and through outer tube annulus 106 on the upper ends of piston section 66 and piston 76. A fluid signal at a pressure greater than the vessel pressure by the required differential is applied through channel 114 against the lower end of piston section 66. The net pressure differential appears across and displaces piston 76 upwardly against extension 86 forcing piston section 66 and connecting tube 62 upwardly. Locking spheres 96 escape laterally into the lower recess in piston 76 unlocking the device and permitting the upward motion.

In FIGURE 6 a longitudinally foreshortened view of a modification of the device described in connection with FIGURE 4 is shown. In FIGURE 6 elements which are identical to those shown and described in connection with FIGURE 4 are indicated with the same numbers. The modification shown in FIGURE 6 is provided with a separate jacket 150 which is stationary and extends upwardly from flange 42 parallel to and surrounding outer tube 60. This provides jacket annulus 152 which communicates through channel 154 in flange 42 with hydraulic line 156. This modification amounts to substituting a double-walled element including separate outer tube 60 and jacket 150 shown in FIGURE 6 for the combined jacket and outer tube 60 of FIGURE 4. Jacket annulus 152 thus provided, constitutes a flow channel for fluid from an external fluid accumulator through openings 110 into outer tube annulus 106 at a point above piston 66 and piston section 76. Whereas in the modification of FIGURE 4 the fluid which actuates the device in the downward direction comes through opening 110 and thimble annulus 104 from vessel 10, the device in FIGURE 6 provides for such a source of fluid, and in addition, provides a separate source flowing into the device through line 156, channel 154, and jacket annulus 152.

Each of hydraulic lines 112 and 156 is provided with a control valve schematically shown as three-way valves 158 and 160. Valve 160 is normally in the position shown so that pressure from vessel 10 is applied through lines 162 and 112 and channels 114 to the underside of piston 76. Similarly, valve 158 is normally in the position shown providing the same fluid pressure from vessel 10 through thimble annulus 104, lines 164 and 156, channel 154, jacket annulus 152, the opening 110 to the upper side of piston 76. Since these pressures are equal, locking piston 76 is in the central or locked position as indicated more clearly in FIGURE 4. To drive the device upwardly, valve 160 is shifted to connect it to line 166 supplying a pressure equal to the vessel 10 pressure plus the required differential. This places the pressure differential upwardly across piston 76, unlocking the lock, and moves connecting tube 62 upwardly. To move the device downward, valve 158 is connected to line 168 connected to another accumulator at a pressure equal to the vessel pressure plus a differential which places the differential downwardly across piston 76, again unlocking the device and moving it.

In the event a scram is necessary, valve 158 remains in the position shown, or is moved to a third position 170 which vents the upper part of the outer tube annulus 106 to a very low pressure, and valve 160 either remains connected to vessel pressure through line 162 or is moved to apply the accumulator pressure in line 166 to provide a very high differential across piston 76 and drive connecting tube 62 at the scram rate. A particularly desirable embodiment of this invention includes provision of pressure responsive control valves to achieve automatic selection of the higher of the two available pressures; namely, the vessel pressure through line 162 or the separate accumulator pressure through line 166, to obtain scram movement. Such valves are hereafter described in detail in FIGURES 7 and 9.

In FIGURE 7 is shown a longitudinal cross-section view of an embodiment of this invention employing a translating locking piston and in which a pressure responsive three-way fluid source selector valve or shuttle valve is incorporated in one of the base flanges. The function of this shuttle valve is to select between two complementary high-pressure fluid sources and connect one end of the annular space in which the driving-locking piston operates to the higher pressure source for scram purposes. The high pressure for scram movement comes from the shuttle valve center or common ports and is applied to the underside of the piston. The other two ports of the shuttle valve are connected to an external fluid accumulator as one fluid source, and to the vessel within which the revice of this invention operates as the other fluid source. As long as there is a higher fluid pressure available from the external accumulator, the shuttle valve remains connected to that source due to a positive pressure differential at the valve tending to keep it in that position. In the event this external pressure source fails or its pressure decreases, or in the event that an excessive rise in pressure occurs in the vessel, the resultant pressure differential between the vessel and external accumulator pressures and which appears across the shuttle valve is negative or reversed from normal. When this negative pressure differential exceeds a predetermined value, the shuttle is actuated, closing the connection from the lower part of the driving-locking piston to the external accumulator, and connecting vessel pressure to the bottom of the driving-locking piston for scram purposes. Restoration of the external accumulator pressure moves the shuttle valve back to its normal position and restores the accumulator as the source of scram pressure.

In FIGURE 7 are shown essentially the internal details of the shuttle valve which is located in the flange by means of which the device of this invention is secured into and sealed to lower thimble flange 44. Thimble 38, thimble annulus 104, jacket 150, jacket annulus 152, stationary outer tube 60, outer tube annulus 106, reciprocating tube 62, piston section 66, and stationary inner tube 64 provided with circumferential grooves 72, upper and lower loading springs 78 and 80, locking and drive piston 76, locking spheres 96, and other correspondingly numbered elements are analogous to those previously described in connection with FIGURES 4, 5, and 6.

A double flange consisting of intermediate section 170 and lower section 172 are substituted in this modification for connecting flange 42 shown in FIGURES 1, 4, 5, and 6. Jacket 150 and outer tube 60 are integrally connected to intermediate section 170, inner stationary cylinder 64 is integrally connected to lower flange section 172, the two-flange sections being integrally connected together by means of bolts 174 and are sealed at 176 providing a concentric fluid-tight structure essentially as previously described, but with added space for internal pressure responsive valving and fluid connections.

Channel 154 opens downwardly through thimble flange 44 and part of intermediate flange section 170 performing the function described previously in connection with FIGURE 6; namely, to supply fluid from the vessel as one of the two sources, through jacket annulus 152 through the apertures 110 shown in that figure in the upper regions of outer tube 60 and downwardly through outer tube annulus 106 to the upper part of piston 76 for unlocking and downward motion. Channel 114 opens from an external fluid accumulator as the second source through thimble flange 44, but in this modification continues into the upper end of a shuttle valve mechanism indicated in intermediate flange section 170. This shuttle valve mechanism consists of movable shuttle element 178 open at both ends and provided with intermediate apertures 180, a first or upper valve having a seat 182 closed at its lower end and provided with lateral openings 184, and a lower or second valve having seat 186. The upper valve communicates through aperture 182 with an upper chamber 188 and with inlet channel 114. The lower valve is provided in lower chamber 190 and communicates through an internal channel shown schematically in broken lines as 192 with thimble annulus 104 adjacent the upper surface of intermediate flange section 170. The intermediate port 180 communicates through intermediate shuttle valve chamber 194 and central chamber 196 with the lower end of outer tube annulus 106 below piston 76.

Vessel fluid pressure is supplied to the second inlet end of shuttle valve 178 through thimble annulus 104, channel 192 and second chamber 190. External accumulator fluid pressure is supplied to the first inlet end of shuttle valve 178 through channel 114, apertures 184, and upper chamber 188. Under normal operating conditions, when the external accumulator fluid pressure is higher than the vessel pressure, the pressure differential acts downwardly with gravity on shuttle valve 178 as shown and maintains the valve in the position indicated; that is, with the upper valve open and the lower valve closed. This supplies accumulator pressure to driving piston 66 rather than vessel pressure. With top entry control elements, the device is inverted from the position shown in FIGURE 7, and the pressure differential must be a little higher to overcome gravity and hold valve element 178 against seat 186.

The operation of the embodiments of this invention is essentially the same as that described before. Piston 76 remains locked in the absence of a pressure signal. Upon the application of a fluid pressure signal it unlocks and moves connecting tube 62 in the appropriate direction. The down motion fluid pressure is supplied through channel 154 while upward motion fluid pressure is supplied through channel 114. On a scram signal, channel 154 may be vented to a low pressure sump, shuttle valve 178 then operates to communicate center chamber 194 and the lower side of driving-locking piston 76 with the vessel through thimble annulus 104 or the external accumulator through channel 114, depending on which fluid source is at the higher pressure, thereby moving the connecting tube 62 upwardly very rapidly.

In FIGURE 7 it should be noted that the upper wall thickness of shuttle element 178 is greater than the wall thickness in the lower part. In the event the device is mechanically oriented as shown on the drawing, gravitational forces tend to keep shuttle valve element 178 in the position shown. The relative cross-sectional areas of the walls of shuttle valve 178 may be varied to predetermine the pressure differential which will be sufficient to actuate the shuttle valve against the accumulator pressure, unlock the device, and drive the connecting tube upwardly. This determines the extent of over pressure which may be tolerated in the vessel relative to the external accumulator as well as the extent of loss of accumulator pressure relative to the vessel pressure at which the device automatically will scram driving the control rods into the reactor core.

In FIGURE 8 a partial transverse cross-section view of intermediate flange section 170 is shown indicating jacket 150 and thimble annulus 104. It was noted above that channel 192 was shown schematically; in FIGURE 8 this channel is shown as it may actually be provided in intermediate flange section 170. A radial opening 198 is drilled through flange 170 and plugged at its outer end at 200. Channel 198 is angularly displaced from the longitudinal plane of channel 114. A second opening 202 is then drilled angularly downwardly through flange 170 intersecting radial opening 198 at one end and intersecting at the other end lower chamber 190. The outer end of opening 202 is then plugged if necessary by means not shown but in a manner analogous to plug 200. This provides channel 192 opening from thimble annulus 104 through flange 170 into lower chamber 190 at the lower end of shuttle valve 178.

Operation of the fluid-actuated linear motion-producing device of this invention is independent of the normal operating pressure present in the vessel into which the device extends to move the load to which it is connected. The pressure maintained in the various annuli and the various areas against which these pressures operate insure smooth operation over a wide range of fluid pressure in which the device operates. Vessel pressure is normally applied below the locking piston by means of the control valves. Openings through the piston and the tube elements shown in FIGURES 4 through 7 provide that vessel pressure is also maintained in the reciprocable tube annulus between the reciprocable tube and the stationary inner tube. The end of the reciprocable tube is exposed to vessel pressure as it emerges at the upper end of the stationary jacket and provides an area against which vessel pressure is effective to produce a downward force. Openings shown at the upper ends of the reciprocable tube are provided to reduce this effective area to that of the wall thickness. The effective area of the driving piston, however, is greater so that vessel fluid pressure applied below the piston will drive it up against the downward force, including forces of gravity, in all embodiments of this invention. The upper end of the stationary inner tube is also exposed to vessel pressure and it resists this pressure by compression or column action. The loading conditions in devices embodying this invention over a range of normal operating pressure are indicated below.

At full reactor pressure there is a net downward force on the reciprocable tube. A low pressure above the piston permits the locking piston to slide relative to the reciprocable tube. The driving piston raises the connecting tube against its tendency to move down, thereby insuring against "ratcheting" of the locking mechanism. For downward travel, high pressure is inserted above the driving piston. This high pressure is effective against both the piston to move it down and against the reciprocable tube or rod shoulder to produce a separating force. The high pressure against the shoulder opposes the downward force due to reactor pressure on the reciprocable tube extension in the reactor. The piston, therefore, pulls the rod down against its tendency to move up. Similar conditions prevail for zero or low reactor pressure conditions. There is then either a low force or no force at all on the reciprocable tube extension. All the operating forces on the locking piston are due to the control pressures. A pressure to drive the piston down will easily produce the separating force between the locking piston and reciprocable tube. The reciprocable tube tends to move up, the piston pulls it down. A pressure to drive the tube up forces the locking piston up while depending upon control rod weight and inertia to produce the necessary separating force to keep the latching system from "ratcheting" in this mode of operation.

Figures 9, 10, 11:
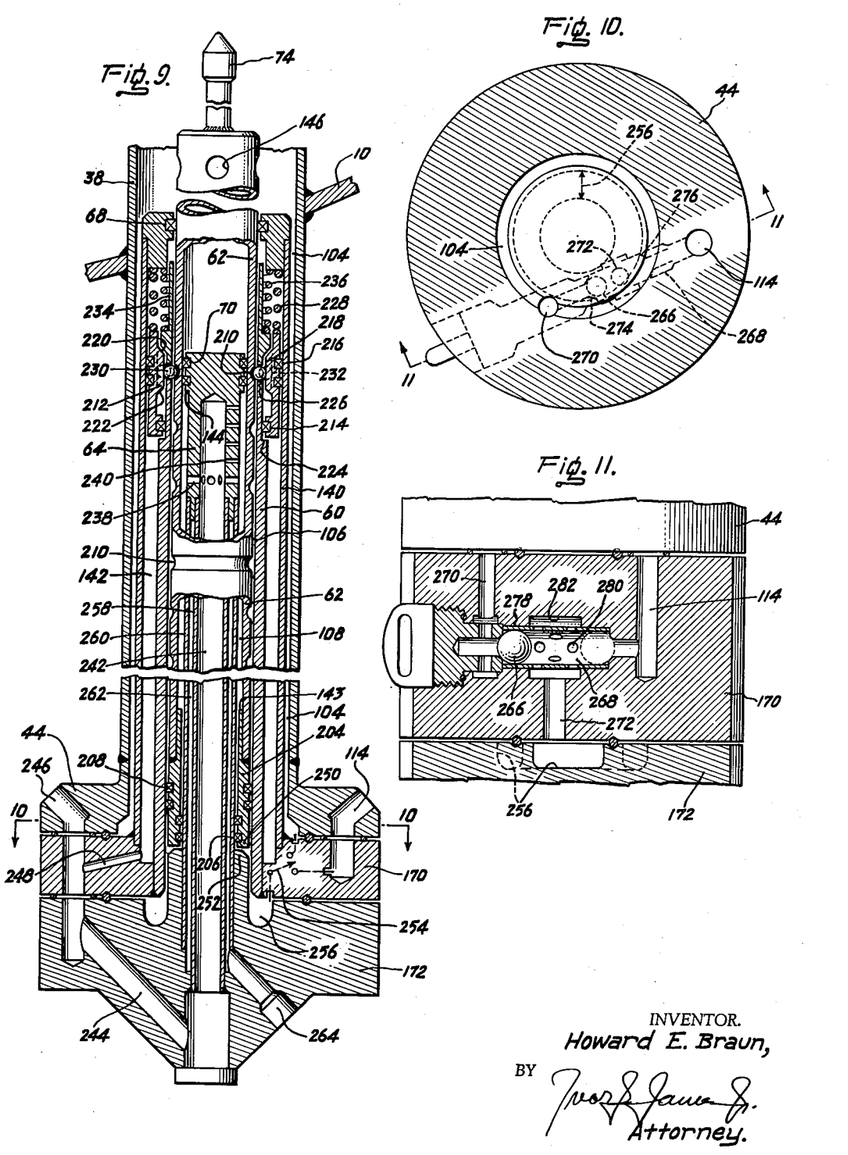
FIGURE 9 is a vertically foreshortened longitudinal cross-section view of another embodiment of this invention provided with a stationary or non-translating locking means and a modified form of pressure responsive three-way valve means.
FIGURE 10 is a transverse cross-section view of the intermediate flange of the device shown in FIGURE 9.
FIGURE 11 is a longitudinal cross-section view of the three-way valve means illustrated in FIGURE 10.

In FIGURE 9 is shown another embodiment of the present invention in which separate locking and driving pistons are provided. The locking piston is located at the upper end of the mechanism and it does not translate or move with reciprocable tube 62 as in the various embodiments previously described. In FIGURE 9 elements which correspond to those previously described are indicated by the same numbers. The following principal elements have been previously shown: vessel 10, thimble 38, thimble annulus 104, jacket 140, jacket annulus 142, stationary outer tube 60, outer tube annulus 106, reciprocable tube 62, reciprocable tube annulus 108, thimble flange 44, intermediate flange section 170, lower flange section 172, inner stationary cylinder 64 here shown with a double wall, inner seal rings 70, outer seal rings 68, stop surfaces 142 and 144, and spud 74.

At the lower end of connecting tube 62 is rigidly connected driving piston 204 provided with inner and outer seal or piston rings 206 and 208. A plurality of circumferential locking grooves 210 are disposed along the external surface of connecting tube 62.

The locking piston 212 is provided with inner and outer seal or piston rings 214 and 216 and is provided further with locking land 218 and adjacent cam surfaces 220 and 222. Locking piston 212 is indicated at the top or output end of the drive mechanism, being supported above locking piston limit surface 224 near the upper end or bearing surface 226 of outer tube 60. Locking piston 212 is further provided with an upper loading spring 228 biasing piston 212 downwardly against limit surface 224. The upper end 226 of outer tube 60 serves as the support and load bearing surface for the plurality of laterally movable locking spheres 230. These spheres are located immediately opposite the normal position of locking land 218 as shown. With the diameter of spheres 230 being greater than the lateral thickness of bearing surface 226 and the locking land 218 in the position shown, the spheres project into engagement with the locking surface provided in groove 210. Reciprocable tube 62 is locked to ground through locking spheres 230 and outer tube 60.

To lower reciprocable tube 62, locking piston 212 must be displaced upwardly against loading spring 228 to displace locking land 218 and permit escape of locking spheres 230 into recesses in the locking piston to assume the positions shown as the broken circles 232. Reciprocable tube 62 can be lowered only upon a fluid pressure command signal which moves locking piston 212 upwardly against loading spring 228. Downward load forces acting on reciprocable tube 62 do not produce unlocking forces which actuate piston 212 and unlock the device, but rather place spheres 230 in shear and transmit the load to outer stationary tube 60.

However, for upward movement of reciprocable tube 62, the locking piston 212 need not be actuated. This is due to the effect of reciprocable sphere retainer 234 biased downwardly by means of loading spring 236 in turn biasing spheres 230 downwardly against bearing surface 226. Thus, upward movement of reciprocable tube 62 induced by a pressure differential or drop upwardly across driving piston 204 displaces locking spheres 230 upwardly together with sphere retainer 234 against loading spring 236 until the spheres escape laterally and outwardly past cam surface 220 into the recess immediately above locking land 218. This removes locking spheres 230 from peripheral grooves 210 and reciprocable tube 62 moves upward freely. Termination of the upward pressure differential at piston 204 may permit reciprocable tube 62 to move back downwardly by forces of gravity or other, whereupon loading spring 236 and retainer 234 coact to return locking spheres 230 downwardly across the cam surface 220 of locking land 218 and laterally over bearing surface 226 to engage with a peripheral groove 210 as shown.

The actuating fluid connections provided to actuate driving piston 204 and locking piston 212 in the manner described, are described below. Inner tube 64 is provided near its upper end with a plurality of relatively large radial openings 238 and a plurality of relatively small radial braking orifices 240 above openings 238. The central open channel 242 in stationary inner tube 64 communicates at its lower end through channel 244 and connection 246 with an external fluid accumulator. Channel 244 also communicates through channel 248 with jacket annulus 142. A fluid pressure signal applied through connection 246 acts through channel 248 and jacket annulus 142 on the underside of locking piston 212 moving it upwardly against loading spring 228 and permitting locking spheres 230 to escape into the lower recess of the locking piston upon a displacement force from reciprocable tube 62. This releases the shear lock previously established between the upper end of outer tube 60 through locking spheres 230 and connecting tube 62. The applied fluid pressure also acts through channel 244, central channel 242, and openings 238 and then downwardly through reciprocable tube annulus 108 onto the upper end 142 of drive piston 204. This causes downward motion of the now unlocked reciprocable tube which displaces spheres 230 outwardly. Downward movement continues until the lower end 250 of piston 204 contacts the upper end of stop 252 as shown, or until the device is again locked by release of the pressure differential across the drive and locking pistons.

In FIGURE 9 shuttle valve 254 is schematically shown in intermediate flange section 170. Valve 254 functions in the same manner as that described in connection with FIGURE 7. The detail of another embodiment of the shuttle valve of this invention is subsequently described in connection with FIGURE 10. Shuttle valve 254 is pressure responsive and automatically communicates with the fluid source having the higher pressure for upward reciprocable tube movement. As before described, one source is the vessel opening through thimble annulus 104, and the other source is an external accumulator opening through inlet channel 114. Fluids at the higher of these two pressures are supplied to the lower surface 250 of drive piston 204 through a circular channel 256 in lower flange section 172.

As indicated in FIGURE 9, all but the upper orificed position of stationary inner tube 64 is a double-walled structure consisting of inner and outer walls 258 and 260 providing an inner tube annulus 262 therebetween. This annulus communicates through connection 264 and is provided for the inductive position indicating circuitry referred to previously.

In FIGURE 10 a semi-schematic transverse cross-section view of the flange assembly of FIGURE 9 is shown taken at the plane indicated. The cross-hatching of thimble flange 44 which normally would be shown in such a view is only partially shown for purposes of clarity of illustration. Thimble annulus 104 through which vessel fluid is supplied and inlet channel 114 through which external accumulator fluid is supplied are shown. The pressure sensitive shuttle valve in this embodiment of the invention is ball valve type including ball 266 movable in a horizontal bore 268. Thimble annulus 104 communicates through a vertical bore or channel 270 with one end of the shuttle valve bore 268 while accumulator inlet channel 114 communicates directly with the other end of the bore. A third vertical bore 272 communicates circular channel 256 with the central portion of the shuttle valve structure. Valve ball 266 assumes a position in bore 268 between valve seats 274 and 276 depending upon whether the higher pressure is supplied through bore 270 from the vessel or through inlet channel 114 from the accumulator.

In FIGURE 11 is a vertical partial cross-section view of the device shown in FIGURE 10. Parts of thimble flange 44, intermediate flange section 170, and lower flange section 172 are shown. Accumulator inlet channel 114 communicates with the right hand end of shuttle valve bore 268. The left hand end of bore 268 communicates through channel 270 with the thimble annulus 104 as indicated in FIGURES 9 and 10. Shuttle valve ball 266 is shown in the left hand position. Shuttle valve body 278 is provided with intermediate apertures 280 opening into a surrounding channel 282 which communicates through vertical bore 272 with circular channel 256.

The linear motion-producing device of this invention, of which several embodiments have been described above in considerable detail as applied to the movement of nuclear reaction poison-containing control elements in a nuclear reactor, provides for added safety of self-scraming in the event that the vessel pressure rises to a predetermined undesirably high level or if the external accumulator pressure falls to a predetermined undesirably low level. This self-scraming feature results from the placement of reactor vessel pressure below the driving piston as a static pressure. In the embodiments described which include the shuttle valve, this valve normally connects the underside of the driving piston to the high-pressure fluid in an external accumulator. The shuttle valve in this normal position closes the connection between the shuttle valve and the vessel through the thimble annulus but opens it in the event the pressure changes occur as described above.

In a nuclear reactor vessel designed to operate at about 1,000 p.s.i., the shuttle valve is set to flip over to utilize reactor vessel pressure on a differential of about 500 p.s.i. In the event of reactor vessel overpressure above its normal pressure by this 500 p.s.i. differential or in the event the accumulator pressure drops to below about 500 p.s.i., the shuttle valve moves from its normal external accumulator connection to connect reactor vessel pressure to the underside of the drive piston producing a positive differential across the piston driving the control rods into the core. In this inserted position, the automatically acting locking devices hold the control elements in the scram position preventing them from drifting back out of the core under gravitational or other forces. This self-scraming action is entirely automatic, produced solely by the rise in vessel pressure or fall in accumulator pressure and does not require manual direction or movement of any valve other than the shuttle valve.

Referring now to FIGURE 12, a semi-schematic view of one embodiment of the system for indicating the position of the reciprocable tubes described above is shown. In this device inner stationary tube 64 with its open inner channel 190 is provided with an elongated inductance 284 provided with end connections 286 and 288. Stationary inner tube 64 is fabricated of a metal having a low magnetic permeability such as the 300 series stainless steels or the like. Disposed immediately around inner tube 64 is reciprocable tube 62 which is fabricated from a material having a relatively high magnetic permeability. The vertical movement of reciprocable tube 62 with respect to inductance 284 varies the inductive reactance of inductance 284 from a low value, when reciprocable tube 62 is in a high position, to a high value when tube 62 is telescoped down around the full length of inductance 284.

To provide for the remote indication of the relative position of reciprocable tube 62 with respect to inductance 284, a simple circuit such as that shown in FIGURE 12 may be used. An alternating current source 290 supplies current through inductance 284 and current indicating means 292. The current flow indicated at means 292 is proportional to the applied voltage from source 290 and inversely proportional to inductive reactance of inductance 284. The applied voltage is preferably constant and movement of reciprocable tube 62 produces a variation in indicated current with position substantially as shown in curve 294 in FIGURE 14.

In FIGURE 13 another embodiment of the reciprocable tube remote position indicating means is shown. A core rod 296, fabricated of a relatively high magnetic permeability material, is provided along substantially the full length of inner tube 64. Around core rod 296 are placed a plurality of alternate clumped inductances 298 and annular core elements 300 also of high magnetic permeability. Inductances 298 are connected in series with one another between terminals 302 and 304. As in FIGURE 12, the inner stationary tube 64 has a relatively low magnetic permeability while reciprocating tube 62 has a relatively high permeability. Movement of tube 62 changes the inductance of individual inductances 298. The physical position of inductances 298 along core rod 296 is made to correspond to a locked position of reciprocating tube 62 in the devices described above. The pitch spacing of the inductances 298 and annular core elements 300 can be altered to achieve the desired position resolution. If the individual clumped inductances are connected in series opposition; that is, start to finish, finish to start of windings, etc., the output current will alternate between minimum and maximum values with reciprocable tube movement as indicated generally in curve 306 in FIGURE 14. If, without regard to amplitude, the pulses appearing in the curve 306 which result from a traverse by reciprocable tube 62 past the coil-washer combinations, are discriminated for direction and counted and recorded, a rod position indication is obtained.

In addition, added inductance 308, with separate terminal 310 and inductance 312 with separate terminal 314, are provided to indicate the arrival of the reciprocable tube and any load connected thereto at the extreme upper and lower positions. The independent end position indications are also provided to recalibrate the main coil position indication starting points when necessary.

As a specific example of the present invention, the following information is given concerning its application in the remote positioning of control elements in a nuclear power reactor. The nuclear chain-reacting assembly is contained in a pressure vessel 12.5 feet inside diameter, 41.5 feet inside height, 5.5 inches in wall thickness, and designed to operate at a pressure of 1250 p.s.i. The reactor core is a natural water-cooled and moderated nuclear chain-reacting assembly containing 466 fuel assemblies 9.9 feet long and disposed in a bundle fitting into a 10.7 foot diameter circumscribed circle. Each assembly is provided with a 6 by 6 square array of uranium dioxide-filled fuel tubes approximately 0.5 inch in diameter and spaced approximately 0.75 inch center to center. Eighty control elements of cruciform cross-section approximately 0.375 inch thick and approximately 6.5 inches in width are disposed between an adjacent group of four fuel assemblies. The control elements are spaced 9.96 inches apart from one another, they have an 8.6 foot active poison section length and have an 8.83 foot travel. The control elements are individually reciprocable in the chain-reacting assembly by means of a fluid-actuated device of this invention. The operating pressure is 1050 p.s.i.a. in the reactor vessel, heat is released in the reactor core at a rate of 686 thermal megawatts, the heat being dissipated in water circulated at a rate of about 26.5 million pounds per hour, of which approximately 1.5 million pounds per hour is discharged from the core as saturated steam. The fluid used to actuate the device of this invention is demineralized natural water maintained in separate accumulators at a pressure of about 1500 p.s.i.a. One accumulator provides operating fluid to two control element drive mechanisms, each mechanism being provided with an internal selector or shuttle valve so that it is operable either by means of reactor fluid pressure or external accumulator fluid pressure in the manner described.

The principal dimensions of one embodiment of this invention as shown in FIGURE 9 and applied to the reactor system described above are as follows:

| | Inches |
|---|---|
| Thimble: | |
|    Outside radius | 2.375 |
|    Wall thickness | 0.375 |
| Jacket: | |
|    Outside radius | 1.750 |
|    Wall thickness | 0.134 |
| Outer tube: | |
|    Outside radius | 1.500 |
|    Wall thickness | 0.240 |
| Driving piston: | |
|    Outside radius | 1.220 |
|    Wall thickness | 0.430 |
| Reciprocable tube: | |
|    Outside radius | 1.120 |
|    Wall thickness | 0.180 |
| Inner tube: | |
|    Outside radius | 0.750 |
|    Wall thickness | 0.120 |
| Locking piston: | |
|    Outside radius | 1.600 |
|    Wall thickness— | |
|       At land | 0.245 |
|       At recess | 0.1825 |
|       Length | 2.6875 |
|    Travel | 0.5 |
| Locking spheres: | |
|    Number (solid peripheral row) 30. | |
|    Diameter | 0.1875 |
| Sphere retainer: | |
|    Inside radius | 0.880 |
|    Wall thickness— | |
|       Upper section | 0.055 |
|       Lower section | 0.180 |
| Shuttle valve: | |
|    Valve body— | |
|       Outside diameter | 0.751 |
|       Wall thickness | 0.0625 |
|       Length | 1.550 |
|    Valve ball, diameter | 0.562 |
|    Ball travel | 1.14 |

The foregoing description of several embodiments of this invention has for clarity of illustration been described in connection with the linear movement of control elements into and out of a nuclear chain-reacting assembly to control a nuclear reactor. It is to be understood, however, that in no sense is this to be considered a limitation on the application of the utility of this invention. On the contrary, the device is of general applicability in the remote production of linear motion in a region which may be enclosed in a sealed vessel and maintained at extreme superatmospheric conditions of pressure and temperature and in which remote positioning of any object is desired.

Tubular and coaxial elements have been shown herein with circular cross-sections. If desired, other hollow tubular forms with square, hexagonal, rectangular, or other cross-sections may be used.

Actuating fluids may be liquids, vapors, or gases.

Several particular embodiments of this invention have been described in considerable detail by way of illustration. It should be understood that various other modifications and adaptations thereof may be made by those skilled in this particular art without departing from the spirit and scope of this invention as set forth in the following claims.

I claim:

1. A linear motion-producing apparatus which comprises a stationary element, a reciprocable element disposed coaxially with respect to said stationary element and including a driving piston and a connecting element secured to said piston, means for supplying actuating fluid to move said driving piston and said connecting element relative to said stationary element, one of said elements being provided with a plurality of peripheral grooves spaced apart from one another and each providing a lock surface in a surface of said element immediately adjacent the surface of the other of said elements, the other element being provided with a least one lateral bearing surface, and a locking means laterally movable adjacent said bearing surface and normally biased into contact with the grooved surface of said one element and adapted to engage one of said grooves and thereby lock said reciprocable element to said stationary element at any one of a plurality of positions corresponding to the location of said peripheral grooves.

2. An apparatus according to claim 1 wherein said stationary element is grooved and said locking means is laterally movable adjacent the bearing surface provided in an aperture in part of said reciprocable element.

3. An apparatus according to claim 2 wherein said driving piston is disposed coaxially adjacent a portion of said reciprocable element and is reciprocable with respect thereto within fixed limits and is provided with a land immediately adjacent said aperture and adapted to drive said reciprocable element and bias said locking means through said aperture into contact with the grooved surface of said stationary element.

4. An apparatus according to claim 2 wherein said means for introducing and removing fluid to and from said annular space includes a jacket element coaxially surrounding and spaced apart from said outer tubular element forming a jacket annulus therebetween, said jacket being integrally secured at each end to the corresponding ends of said outer tubular element, said jacket annulus communicating through at least one opening in the wall of said outer tubular element with said annular space between said stationary elements.

5. An apparatus according to claim 1 wherein said reciprocable element is grooved and said locking means is laterally movable adjacent a bearing surface in part of said stationary element.

6. An apparatus according to claim 5 in combination with an unlocking piston disposed coaxially adjacent a portion of said stationary element and is reciprocable with respect thereto within fixed limits and is provided with a land immediately adjacent said bearing surface, loading spring means adapted to position said unlocking piston so that said land biases said locking means laterally adjacent said bearing surface into contact with the grooved surface of said reciprocable element, and means for supplying fluid under pressure to actuate said unlocking piston against said spring.

7. A linear motion-producing apparatus which comprises stationary coaxial inner and outer tubular elements having an annular space therebetween, a reciprocable tubular element disposed in said annular space and including a driving piston and a connecting tube secured to said piston and extending from said annular space for connection to a load, means for introducing and removing fluid to and from the ends of said annular space to actuate said piston, one of said tubular elements being provided with a plurality of locking surfaces in peripheral locking grooves spaced apart from one another on a surface thereof which is immediately adjacent the surface of another of said tubular elements, said another element being provided with at least one lateral bearing surface, and laterally movable locking means disposed immediately adjacent said bearing surface and normally biased into contact with the grooved surface of the peripherally grooved tubular element and adapted to engage said groove and lock said stationary and reciprocable elements together in the absence of a fluid pressure unlocking signal.

8. An apparatus according to claim 7 wherein said locking means comprises laterally movable spheres.

9. An apparatus according to claim 7 wherein said means for introducing and removing fluid at one end of said annular space includes pressure responsive three-way valve means connected in fluid-delivery relation to one end of said annular space and also connected in fluid-receiving relation to two sources of actuating fluid under pressure, said valve being adapted to connect said annular space to the higher pressure source of actuating fluid.

10. An apparatus according to claim 7 wherein said means for introducing and removing fluid in said annular space includes, in the wall of one of said stationary tubular elements, a relatively large opening spaced apart from the end of said element and a plurality of relatively small braking orifices spaced apart from one another between the end of said element and said large opening and through which fluid displaced from that part of said annular space between said stationary and said reciprocable element escapes on movement of said piston, said opening and said orifices being positioned so that they are sealed off in succession by passage of said piston thereby and thus dissipating the kinetic energy of the moving elements to reduce their velocity near the end of the stroke.

11. An apparatus according to claim 7 wherein said inner tubular element has a low magnetic permeability and said reciprocable element has a high magnetic permeability, in combination with elongated inductance means disposed along substantially the entire length within said inner tubular element, and circuit means connected to said inductance means and including means for passing an electric current through said inductance means and means responsive to the current flowing therethrough whereby said latter means indicates the position of said reciprocable element.

12. An apparatus according to claim 11 wherein said inductance means comprises a core rod of high magnetic permeability material extending along substantially the entire length of said inner tubular element, a plurality of clumped inductances disposed around said core rod and spaced apart from one another, a plurality of annular core elements of high magnetic permeability and disposed one each between the adjacent spaced inductances, the movement of said reciprocable element changing the inductance of said inductance means and varying the current flow therethrough to indicate reciprocable element position.

13. A linear motion-producing apparatus for remote positioning of a load in a sealed vessel which comprises, in combination with a tubular thimble sealed at its inner end to and extending outwardly from said vessel, stationary inner and outer tubular elements having an annular space therebetween and integrally secured and sealed to one another at their outer end and sealed to the outer end of said thimble, a reciprocable element disposed in said annular space and including a driving-locking piston section and a connecting tube secured at its outer end to said section and extending beyond the inner end of said annular space through sealing means into and through at least part of said thimble for connection at its inner end to said load, the inner stationary tubular element being provided on its outer surface with a plurality of peripheral locking grooves providing lock surfaces spaced apart from one another along a substantial length of said element, said driving-locking piston section being provided with a plurality of peripheral locking apertures providing bearing surfaces, a laterally movable locking sphere disposed in each of said apertures, a driving-locking piston sealed on its inner and outer surfaces against the outer and inner surfaces of said driving-locking piston section and said outer tubular element respectively and reciprocable with respect to said section between fixed limits, loading spring means disposed on each side of said piston between its ends and the corresponding end of said section to bias said piston into a central position therein, said piston having an inwardly projecting land between cam surfaces and adapted to contact said locking spheres and displace them through said apertures into contact with the grooved surface of said inner tubular element and into engagement with a locking groove therein when said piston is in said central position in the absence of a fluid pressure unlocking signal thereby locking the reciprocable element to said inner stationary tubular element, whereby loads tending to move said reciprocable element relative to said stationary element are transmitted from said lock surfaces through locking spheres to said bearing surfaces and are resisted by shear forces in said spheres, and means for introducing and removing to and from the ends of said annular space a fluid under pressure to establish between the ends of said driving-locking piston a pressure differential as a fluid pressure unlocking signal to displace said piston from said central position against said spring load and said limit and to displace said land from adjacent said locking spheres and permitting said spheres to move laterally from said grooves thereby unlocking said reciprocable element and moving it in the direction of the pressure differential.

14. An apparatus according to claim 13 where said means for introducing and removing fluid includes pressure responsive three-way valve means connected in fluid-receiving relation to said vessel as a fluid source through said thimble and in fluid-receiving relation to an independent source of fluid and in fluid-delivering relation to the outer end of said annulus, said three-way valve being adapted to connect said annular space to the higher pressure fluid source and to actuate said driving-locking piston in the event the pressure of fluids in said vessel is sensed to be more than a predetermined amount above the pressure in the independent source of fluid.

15. An apparatus according to claim 13 wherein said inner stationary tubular element is sealed at its inner end, in combination with a position indicating means disposed within said inner tubular element and adapted to provide a remote indication of the position of said reciprocable element.

16. A linear motion-producing apparatus for remote positioning of a load in a sealed vessel which comprises, in combination with a tubular thimble sealed at its inner end to and extending outwardly from said vessel, stationary inner and outer tubular elements having an annular space therebetween and integrally secured and sealed to one another at their outer end and sealed to the outer end of said thimble, a reciprocable element disposed in said annular space and including a driving piston and a connecting tube secured at its outer end to said piston and extending beyond the inner end of said annular space through sealing means into and through at least part of said thimble for connection at its inner end to said load, a stationary jacket element surrounding and spaced apart from said outer tubular element forming a jacket annulus therebetween, the reciprocable element being provided on its outer surface spaced with a plurality of peripheral locking grooves spaced apart from one another along a substantial length of said element and providing lock surfaces, a plurality of laterally movable locking spheres disposed adjacent bearing surfaces at the end of said outer tubular element, a locking sphere retainer reciprocably disposed adjacent said spheres and adjacent said reciprocable element, a loading spring biasing said retainer against said spheres, a locking piston sealed on its inner and outer surfaces against the outer and inner surfaces of said outer tubular element and said jacket element respectively and reciprocable with respect to said elements between fixed limits, loading spring means disposed on one side of said locking piston to bias said piston into a position adjacent one limit, said piston having an inwardly projecting land between cam surfaces and adapted to contact said locking spheres and displace them between said sphere retainer and said bearing surfaces into contact with outer grooved surface of said reciprocable element and into engagement with a locking groove therein when said piston is biased by said locking spring against said limit in the absence of a fluid pressure unlocking signal, whereby loads tending to move said reciprocable element relative to said stationary element are transmitted from said lock surfaces through locking spheres to said bearing surfaces and are resisted by shear forces in said spheres, conduit means connected to introduce a fluid under pressure into said jacket annulus as a fluid pressure unlocking signal to displace said locking piston against said loading spring and displace said land from adjacent said locking spheres permitting said spheres to move laterally from said groove thereby unlocking said reciprocable element from said outer stationary element, said conduit means also connected to introduce said fluid into one end of said annular space and actuate said driving piston and move said reciprocable element in one direction, and conduit means connected to introduce a fluid under pressure into the other end of said annular space to actuate said driving piston and move said reciprocable element in the other direction displacing said locking spheres and said sphere retainer against the spring load and unlocking said reciprocable element in the absence of a fluid pressure unlocking signal.

17. An apparatus according to claim 16 wherein said one end of the annular space is the inner end, said other end of said space is the outer end, whereby said reciprocable element is movable outwardly only if said locking piston is actuated to unlock said reciprocable element and whereby said element is movable inwardly on actuation of said driving piston only.

18. An apparatus according to claim 16 wherein said conduit means for introducing fluid into said other end of said annular space includes pressure responsive three-way valve means connected in fluid-receiving relation to said vessel as a fluid source through said thimble and in fluid-receiving relation to an independent source of fluid and in fluid-delivering relation to the other end of said annulus, said three-way valve being adapted to connect said annular space to the higher pressure fluid source and to actuate said driving piston in the event the pressure of fluids in said vessel is sensed to be more than a predetermined amount above the pressure in the independent source of fluid.

19. An apparatus according to claim 16 wherein said inner stationary tubular element is sealed at its inner end, in combination with a position indicating means disposed within said inner tubular element and adapted to provide a remote indication of the position of said reciprocable element.

References Cited in the file of this patent

UNITED STATES PATENTS

| | | |
|---|---|---|
| 2,163,982 | Mercier | June 27, 1939 |
| 2,713,328 | Driskel et al. | July 19, 1955 |
| 2,806,534 | Potts | Sept. 17, 1957 |

FOREIGN PATENTS

| | | |
|---|---|---|
| 573,033 | Great Britain | Nov. 2, 1945 |